United States Patent [19]

Schütze et al.

[11] Patent Number: 5,093,497

[45] Date of Patent: Mar. 3, 1992

[54] PROCESS FOR THE PREPARATION OF A SUBSTITUTED OR UNSUBSTITUTED QUINACRIDONE

[75] Inventors: Detlef-Ingo Schütze, Cologne; Reinold Schmitz, Odenthal, both of Fed. Rep. of Germany

[73] Assignee: Bayer Aktiengesellschaft, Leverkusen, Fed. Rep. of Germany

[21] Appl. No.: 597,276

[22] Filed: Oct. 12, 1990

Related U.S. Application Data

[63] Continuation of Ser. No. 409,196, Sep. 19, 1989, abandoned.

[30] Foreign Application Priority Data

Oct. 12, 1988 [DE] Fed. Rep. of Germany ....... 3834748

[51] Int. Cl.$^5$ .............................................. C09B 48/00
[52] U.S. Cl. ........................................ 546/56; 546/49
[58] Field of Search ....................... 546/56, 49; 106/497

[56] References Cited

U.S. PATENT DOCUMENTS

| | | | |
|---|---|---|---|
| 2,821,529 | 1/1958 | Struve | 546/56 |
| 3,024,239 | 3/1962 | Caliezi et al. | 546/56 |
| 3,298,847 | 1/1967 | Hanke et al. | 546/56 |
| 3,475,436 | 10/1969 | Cooper et al. | 546/56 |
| 3,738,988 | 6/1973 | Jackson | 546/56 |
| 4,298,398 | 11/1981 | Fitzgerald | 106/497 |
| 4,758,665 | 7/1988 | Spietschka et al. | 546/49 |
| 4,812,568 | 3/1989 | Herzog et al. | 546/49 |
| 4,857,646 | 8/1989 | Jaffe | 546/49 |
| 4,880,894 | 11/1989 | Sunkel et al. | 548/325 |
| 4,956,464 | 9/1990 | Bender | 546/49 |

FOREIGN PATENT DOCUMENTS

| | | | |
|---|---|---|---|
| 0313965 | 5/1989 | European Pat. Off. | 546/44 |
| 1210110 | 7/1961 | Fed. Rep. of Germany . | |
| 1225352 | 6/1960 | France . | |
| 727703 | 3/1967 | Japan | 546/49 |
| 828052 | 2/1960 | United Kingdom . | |
| 887373 | 1/1962 | United Kingdom | 546/49 |

OTHER PUBLICATIONS

Starks et al., "Phase Transfer Catalysts" Academic Press, New York (1978) pp. 4-7.

Labana et al., Chemical Reviews, vol. 67, No. 1, 25 Jan. 1967, pp. 1-18.

*Primary Examiner*—Donald G. Daus
*Attorney, Agent, or Firm*—Sprung Horn Kramer & Woods

[57] ABSTRACT

Process for the preparation of a substituted or unsubstituted quinacridone by oxidation of a substituted or unsubstituted dihydroquinacridone with oxygen or an oxygen-containing gas in the presence of alkali, a solvent or diluent and an oxygen transfer agent, which is characterized in that the oxidation is carried out in the presence of a quaternary ammonium compound.

17 Claims, No Drawings

PROCESS FOR THE PREPARATION OF A SUBSTITUTED OR UNSUBSTITUTED QUINACRIDONE

This application is a continuation of application Ser. No. 409,196, filed Sep. 19, 1989, now abandon.

The invention relates to a process for the preparation of quinacridones, the valuable violet or red pigments, by oxidation of dihydroquinacridones.

A large number of processes for the oxidation of 6,13-dihydroquinacridones have been described in the literature.

A preferred oxidizing agent for this reaction is, for example, the sodium salt of nitrobenzene-m-sulphonic acid. Thus, according to U.S. Pat. No. 2,821,529, 6,13-dihydroquinacridone is oxidized in aqueous-alcoholic bases with the sodium salt of nitrobenzene-m-sulphonic acid. Further media which are proposed for this oxidation are, for example, water/N-methylcaprolactam/alkali metal hydroxide (JP 57/108,162) or water/dimethyl-methyl sulphoxide/alkali metal hydroxide (JP 54/135,821).

The oxidation of 6,13-dihydroquinacridones with other aromatic nitro compounds such as, for example, o-nitrotoluene in alcoholic or aqueous-alcoholic solvents has also been described (JP 52/150,439).

It is true that air or oxygen has also been mentioned in all these patent specifications as oxidizing agent, but 6,13-dihydroquinacridones can in most cases not be oxidized quantitatively with air by these processes. This is in particular true for the substituted derivatives.

Furthermore, anthraquinonesulphonic acids, of which—as described in French Patent Specification 1,225,352—at least stoichiometric amounts are necessary for each mole of 6,13-dihydroquinacridone, have been used as oxidizing agent. Furthermore, it is pointed out that the oxidation with oxygen can be carried out only in not very satisfactory yields.

Thus, the processes mentioned are less than satisfactory for various reasons. In particular the oxidation with aromatic nitro compounds has a further disadvantage in that it involves the risk of further oxidation to quinacridonequinones. Therefore, there has been no lack of attempts to improve the oxidation process which uses oxygen or oxygen-containing gases.

German Auslegeschrift 1,210,110 describes a process in which the oxidation of 6,13-dihydroquinacridones is carried out in alcohol, in particular ethylene glycol, water and sodium hydroxide with the addition of small amounts of quinones, such as, for example, anthraquinone, phenanthrenequinone, naphthoquinones or their sulphonic or carboxylic acids. Other reaction media, such as, for example, water/tetramethylene sulphone/alkali metal hydroxide (U.S. Pat. No. 3,475,436), dimethylacetamide or alkanediols, inter alia, with the addition of alkali metal hydroxide (JP 72/09,101), N-alkyl-2-pyrrolidone/alkali metal hydroxide (JP 72/07,703) or $C_{1-3}$-alcohols/water/alkali metal hydroxide with the addition of anthraquinonesulphonic acids (JP 53/94,354) are also proposed for the oxidation using air or oxygen.

Furthermore, U.S. Pat. No. 3,738,988 describes an air oxidation process in which fairly large amounts of iron salts, nickel salts or cobalt salts are used in aqueous-alkaline medium beside anthraquinonesulphonic acids.

However, all abovementioned processes have the disadvantage that they cause difficulties in the work up either due the solvents used or the required addition of metal salts, or else that they are uneconomical due to the required very high dilutions and long reaction times which are necessary in particular in the case of substituted quinacridones.

Surprisingly, the process according to the invention makes it possible to avoid all or some of the abovementioned disadvantages and to obtain quinacridones in high yields and high purity in combination with shorter oxidation times and under reaction conditions of high concentration.

The process according to the invention for the preparation of a substituted or unsubstituted quinacridone by oxidation of a substituted or unsubstituted dihydroquinacridone with oxygen or an oxygen-containing gas in the presence of alkali, a solvent or diluent and an oxygen transfer agent is characterized in that the oxidation is carried out in the presence of a quaternary ammonium compound.

Preferably, the process serves for the preparation of a quinacridone of the formula

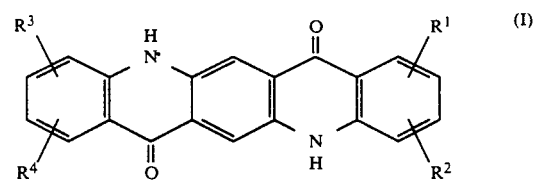

in which $R^1$, $R^2$, $R^3$, $R^4$ are hydrogen or substituents customary for quinacridones, for example $C_1$-$C_4$-alkyl (methyl, ethyl), halogen (chlorine, fluorine), $C_1$-$C_4$-alkoxy (methoxy, ethoxy), trifluoromethyl, carboxyl, carbamoyl which is unsubstituted, monosubstituted or disubstituted by $C_1$-$C_4$-alkyl (methyl, ethyl) or phenyl, sulphamoyl which is unsubstituted, monosubstituted or disubstituted by $C_1$-$C_4$-alkyl (methyl, ethyl) or phenyl.

The process is also suitable for the preparation of mixtures of quinacridones, in particular those of the formula (I).

The compound used in the oxidation is a dihydroquinacridone of the formula

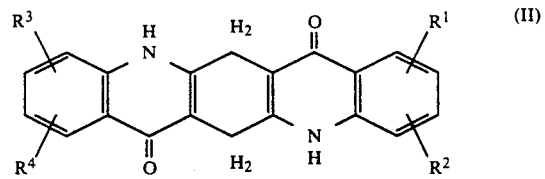

in which $R^1$, $R^2$, $R^3$, $R^4$ have the abovementioned meaning.

Quinacridone mixtures are prepared by using mixtures of dihydroquinacridones.

The 6,13-dihydroquinacridones used according to the invention are known from the literature and can be prepared, for example, from the 2,5-diarylamino-3,6-dihydroterephthalic esters in high-boiling solvents in a temperature range of 240° to 300° C., for example in diphenyl/diphenyl ether mixtures according to U.S. Pat. Nos. 2,821,529 and 2,821,530, in dimethyldiphenyl ether isomer mixtures according to German Offenlegungsschrift 3,605,976, in dibenzyl ether according to JP 5,757,749 or, for example, in polyphosphoric acid according to German Auslegeschrift 1,208,840.

Suitable solvents or diluents are preferably water or alcohols, for example, methanol, ethanol, propanol, isopropanol, n-butanol, glycols or glycol ethers, for example, ethylene glycol, ethylene glycol monomethyl ether, polyglycols, dimethylformamide, dimethyl sulphoxide, N-methylpyrrolidone or mixtures of these solvents.

Particularly preferably, the reaction is carried out in water, alcohol (methanol, ethanol, isopropanol) or water-alcohol mixtures.

The oxygen transfer agents which are used preferably are: quinones such as anthraquinone, phenanthrenequinone, naphthoquinone and chloranil and their sulphonic and carboxylic acids, which can also be used as salts. The use of anthraquinone mono- and -disulphonic acids or their salts is particularly preferred; very particularly preferably, anthraquinone-2-sulphonic acid (salt) is used.

Preferably, 0.5 to 5% by weight of oxygen transfer agents are added relative to dihydroquinacridone.

The quaternary ammonium compounds which are used preferably are compounds of the formula

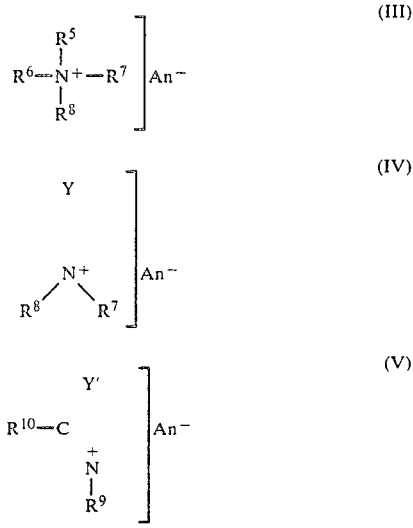

in which
R$^5$, R$^6$, R$^7$, R$^8$, R$^9$ represent C$_1$-C$_{54}$-hydrocarbon radicals, whose C chain can be interrupted by 1 to 15 O atom(s),
R$^{10}$ represents hydrogen or a substituent, for example C$_1$-C$_4$-alkyl (methyl, ethyl) and
Y, Y' represent the remaining members of a preferably 5- or 6-membered ring, for example of a pyridine or imidazole ring, or of a ring system and
An$^-$ represents an anionic radical.

Suitable radicals R$^5$-R$^9$ are in particular: C$_1$-C$_{18}$-alkyl, for example, methyl, ethyl, dodecyl, cetyl, phenyl, phenyl-C$_1$-C$_{18}$-alkyl, for example, benzyl, —CH$_2$CH$_2$O-(—CH$_2$—CH$_2$O—)$_n$—H where n is 0 to 20.

Examples of anionic radicals An$^-$ are: chloride, sulphate, methyl sulphate, benzenesulphonate, toluenesulphonate, hydroxide.

Examples of cationic radicals of the formulae (III) to (V) are: tri-C$_1$-C$_4$-alkylphenylammonium, di-C$_1$-C$_4$-alkyldibenzylammonium, C$_{10}$C$_{16}$-alkyl-tri-C$_1$-C$_4$-alkylammonium, trialkylammonium polyglycol ether, dialkylbenzylammonium polyglycol ether, N-C$_{10}$-C$_{15}$-alkylpyridinium, N-phenyl-C$_7$-C$_{10}$-alkylpyridinium and cationic radicals of quaternization products of C$_1$-C$_4$-trialkylammonium, N-C$_1$-C$_{18}$-alkylimidazolium. The cationic radicals mentioned can be present, for example, in the form of the chlorides, sulphates, methylsulphates, toluenesulphonates, benzenesulphonates or hydroxides.

Individual examples are: trimethylphenylammonium chloride, triethylphenylammonium chloride, trimethylbenzylammonium chloride, triethylbenzylammonium chloride, dimethyldibenzylammonium chloride, diethyldibenzylammonium chloride, dodecyltrimethylammonium chloride, dodecyldimethylbenzylammonium chloride, addition products of 5 to 10 mol of ethylene oxide with C$_{16}$-C$_{20}$-alkylamines, dodecylbenzylalkylamines and dodecylbenzylamine, which are quaternized with dimethyl sulphate or diethyl sulphate, benzylpyridinium chloride, dodecylpyridinium chloride and cetylpyridinium chloride.

The hydrogen sulphates, sulphates, methylsulphates, ethylsulphates, benzene- or toluenesulphonates and hydroxides can be used instead of the chlorides mentioned with the same successful result.

Naturally, the process according to the invention can also be carried out in the presence of mixtures of quaternary ammonium compounds and/or mixtures of oxygen transfer agents.

The amounts of quaternary ammonium salts are, — relative to the 6,13-dihydroquinacridone to be oxidized—in general between 0.1 and 15, preferably between 0.5 and 8% by weight.

Air is used preferably as oxidizing agent. The oxidation can be carried out under pressure.

Depending on the type of solvent or diluent used, the oxidation is preferably carried out at temperatures from 70° to 140° C., particularly preferably at the boiling point of the reaction mixture. The end of the reaction can be determined by UV spectroscopy on samples removed.

Based on 1 part by weight of the substituted or unsubstituted dihydroquinacridone used, preferably 1-20 parts by weight, particularly preferably 5-15 parts by weight, of solvent or diluent and preferably 0.1-3 parts by weight, particularly preferably 0.3-1.5 parts by weight of alkali, for example NaOH or KOH, are used.

The quinacridones can be isolated, for example, by filtering the batch, after the oxidation is completed, while hot, washing the product with water until the filtrate remains colourless, washing it again if necessary with a weak acid, such as, for example, dilute sulphuric acid, to remove traces of alkali, or stirring it therein and drying it. The process according to the invention affords the quinacridones, in particular even the substituted derivatives in their mixtures, in very good yields and at very high purity after comparatively very short reaction times.

The quinacridone pigments can be used either directly or after they have been converted to optimized pigment forms by a formulation process which is known per se for the particular area of application.

The process according to the invention is further illustrated by the exemplary embodiments below. The parts and percentages mentioned therein are by weight.

EXAMPLE 1

12 parts of sodium hydroxide are dissolved in 150 parts of methanol with thorough stirring. After the addition of 30 parts of 6,13-dihydroquinacridone of the β-modification (prepared by cyclization of dimethyl 2,5-dianilino-3,6-dihydroterephthalate in polyphosphoric acid), the suspension is heated to boiling for 60 minutes. 220 parts of hot water at 65° C. are then added, and the mixture is heated again to boiling for 30 minutes. After the addition of 0.75 part of anthraquinone-2-sulphonic acid and 4 parts of a 50% strength aqueous solution of dodecylbenzyldimethylammonium chloride, the mixture is oxidised under reflux by passing in 10 to 15 l of air/hour. The oxidation is completed after 6 hours. The product is filtered off with suction while hot, washed with hot water until the filtrate remains colourless and neutral, and the filter cake is then suspended in 400 parts of water, made acid to Congo red with 2 parts of 50% strength sulphuric acid, and stirred at about 80° C. for 30 minutes. The product is then filtered off with suction, washed with hot water until neutral and dried at 60° to 80° C.

This gives 29.4 parts (=98.6% of theory) of pure γ-quinacridone pigment which, in a stoving enamel, represents a brilliant red having high hiding power, high clarity and very good flow behaviour.

If this example is repeated but without the addition of the quaternary ammonium salt, 11 hours are required for the oxidation.

EXAMPLE 2

If Example 1 is repeated and 2 parts of benzyltrimethylammonium hydroxide are used instead of 4 parts of 50% strength aqueous dodecylbenzyldimethylammonium chloride solution, likewise after 6 hours 29.1 parts (=97.6% of theory) of pure γ-quinacridone pigment with comparably good properties are obtained.

EXAMPLE 3

If Example 1 is repeated and 30 parts of α-dihydroquinacridone (prepared by cyclization of dimethyl 2,5-dianilino-3,6-dihydroterephthalate in a dimethyldiphenyl ether isomeric mixture at 280° to 290° C.) instead of 30 parts of β-dihydroquinacridone are used, after an oxidation time of 5.5 hours 29.5 parts (=98.9% of theory) of pure γ-quinacridone which has the same very good properties are obtained.

EXAMPLE 4

40 parts of sodium hydroxide are dissolved in 190 parts of methanol and 90 parts of water. 30 parts of α-dihydroquinacridone (prepared by cyclization of dimethyl 2,5-dianilino-3,6-dihydroterephthalate in a dimethyldiphenyl isomeric mixture at 280° to 290° C.) are then initially added to this solution, and the mixture is stirred for about 10 minutes. 1 part of anthraquinacridone-2-sulphonic acid and 4 parts of a 50% strength aqueous dodecylbenzyldimethylammonium chloride solution are then added. The mixture is subsequently refluxed for 3 hours while passing in 10 to 15 l of air/hour. The product is then filtered off with suction while hot, washed with hot water, the filter cake is stirred in 600 parts of water/3 parts of 50% strength sulphuric acid at 80° C. for 30 minutes, again filtered off with suction, washed with water and dried at 70° to 80° C.

This gives 29 parts (=97.3% of theory) of a violet product which after, for example by salt milling, can be converted to translucent or opaque β-quinacridone pigments of high purity. When this example is carried out without the addition of quaternary ammonium salt 5.5 hours are required for the oxidation at comparable yield.

EXAMPLE 5

If Example 4 is repeated, using 2 parts of benzyltriethylammonium chloride instead of 4 parts of 50% strength aqueous dodecylbenzyldimethylammonium chloride solution, likewise after 3 hours 29.2 parts (=97.9% of theory) of the violet β-quinacridone crude material are obtained.

EXAMPLE 6

After dissolving 56 parts of potassium hydroxide in 235 parts of methanol and 45 parts of water, 38 parts of 2,9-dichlorodihydroquinacridone (prepared by cyclization of dimethyl 2,5-di-p-chloroanilino-3,6-dihydroterephthalate in polyphosphoric acid) are added, and the mixture is heated to boiling for 60 minutes with thorough stirring.

0.75 part of anthraquinone-2-sulphonic acid and 5 parts of 50% strength aqueous dodecylbenzyldimethylammonium chloride solution are then added. The mixture is oxidized under reflux for 6 hours by passing in 10–15 l of air/hour. The product is filtered off with suction while hot, washed with hot water at about 65° C. until neutral, the filter cake is stirred in 600 parts of water to which 2 parts of 50% strength sulphuric acid have been added, at 80° C. for 30 minutes, again filtered off with suction, washed with water until neutral and dried at 70° to 80° C.

This gives 36.2 parts (=95.8% of theory) of 2,9-dichloroquinacridone which after formulation, for example salt milling, can be converted to translucent or opaque magenta-coloured 2,9-dichloroquinacridone pigments of high purity.

Under the same conditions but without the addition of the quaternary ammonium salt, 35.3 parts (=93.4% of theory) are obtained after an oxidation time of 14 hours.

EXAMPLE 7

If Example 6 is repeated, using 38 parts of 2,9-dichlorodihydroquinacridone which has been prepared in a dimethylphenyl isomeric mixture at 280°–290° C. by cyclization of dimethyl 2,5-di-p-chloroanilino-2,6-dihydroterephthalate, 36.5 parts (=96.6% of theory) of 2,9-dichloroquinacridone of comparable quality are obtained after 6 hours of oxidation.

EXAMPLE 8

50 parts of sodium hydroxide are dissolved in 190 parts of methanol and 45 parts of water. 33 parts of 2,9-dimethyldihydroquinacridone (prepared by cyclization of dimethyl 2,5-di-p-toluidino-2,6-dihydroterephthalate in polyphosphoric acid) are added, and the mixture is heated to 60° to 65° C. for 30 minutes with thorough stirring. 0.75 part of anthraquinone-2-sulphonic acid and 4 parts of a 50% strength aqueous dodecylbenzyldimethylammonium chloride solution are then added. The mixture is oxidised under reflux for 15 hours by passing in 10 to 15 l of air/hour.

Working up according to Example 6 leads to a product in a yield of 31.7 parts (=96.6% of theory) which by formulation, for example, by salt milling, can be converted to translucent or opaque bluish red 2,9-dimethylquinacridone pigments of high purity.

If this example is carried out without the addition of the quaternary ammonium salt, even after 60 hours only about 50% of the 2,9-dimethyldihydroquinacridone have been oxidised.

EXAMPLE 9

If Example 8 is repeated and 2.5 parts of dipolyglycoldodecylbenzylammonium chloride (Soluofen-VV-308 from GAF Corporation) are used instead of dodecylbenzyldimethylammonium chloride, after an oxidation time of 13 hours 31.3 parts (95.4% of theory) of 2,9-dimethylquinacridone of comparable quality are obtained.

EXAMPLE 10

If Example 8 is repeated, using 33 parts of 2,9-dimethyldihydroquinacridone prepared by cyclization of dimethyl 2,5-di-p-toluidino-2,6-dihydroterephthalate in a dimethyldiphenyl isomeric mixture at 280° to 290° C., 32.1 parts (=97.9% of theory) of 2,9-dimethylquinacridone of comparable quality are obtained likewise after an oxidation time of 13 hours.

EXAMPLE 11

50 parts of sodium hydroxide are dissolved in 190 parts of methanol and 45 parts of water. After the addition of 36 parts of 2,9-dimethoxydihydroquinacridone (prepared by cyclization of dimethyl 2,5-di-p-anisidinoterephthalate in polyphosphoric acid), the suspension is thoroughly stirred at 65° C. for 30 minutes. 0.75 part of anthra quinone-2-sulphonic acid and 5 parts of 50% strength aqueous solution of dodecylbenzyldimethylammonium chloride are then added. The mixture is then oxidized under reflux in 12 hours by passing in 10 to 15 l of air/hour.

Working up according to Example 6 leads to a product in a yield of 34.2 g (=95.5% of theory) which can be converted by formulation, for example salt milling, to translucent or opaque blue-violet 2,9-dimethoxyquinacridones of high purity.

The oxidation without the addition of the quaternary ammonium salt at otherwise identical experimental conditions leads to a result only after 24 hours.

EXAMPLE 12

49 parts of potassium hydroxide are dissolved in 235 parts of methanol and 90 parts of water. After the addition of 26.9 parts of 2,9-dichlorodihydroquinacridone and 11.1 g of β-dihydroquinacridone (both prepared by the polyphosphoric acid process), the mixture is thoroughly stirred under reflux for 1 hour. 0.75 part of anthraquinone-2-sulphonic acid and 2.5 parts of benzyltriethylammonium chloride are then added, and the mixture is oxidised under reflux in 5 hours by passing in 10 to 15 l of air/hour.

Working up according to Example 6 gives 35.4 parts (=96.3% of theory) of a product which by formulation, for example salt milling, can be converted into translucent or opaque magenta-coloured pigments of high purity.

If the example is carried out without the addition of the quaternary ammonium salt, it leads to a result only after 10 hours.

EXAMPLE 13

34 parts of 2,9-dimethyldihydroquinacridone (prepared by the polyphosphoric acid process) and 12 parts of potassium hydroxide are stirred in 188 parts of isopropanol at 75° to 80° C. for 1 hour. Another 38 parts of potassium hydroxide, 45 parts of water and 1 part of anthraquinone-2-sulphonic acid and 4.5 parts of 50% strength aqueous dodecylbenzyldimethylammonium chloride solution are then added. The mixture is oxidised under reflux for 6 hours by passing in 10 to 15 l of air/hour.

The product is filtered off with suction while hot, washed with water, the filter cake is stirred in 450 parts of water to which 2 parts of 50% strength sulphuric acid have been added, at 80° C. for 30 minutes, again filtered off with suction, washed with water until neutral and dried at 70° to 80° C.

This gives 32.3 parts (=95.6% of theory) of 2,9-dimethylquinacridone which by formulation, for example by salt milling, can be converted to translucent or opaque bluish red 2,9-dimethylquinacridone pigments of high purity.

EXAMPLE 14

11 parts of sodium hydroxide are dissolved in 200 parts of water. 28 parts of dihydroquinacridone (prepared by the polyphosphoric acid process), 0.75 part of anthraquinone-2-sulphonic acid and 4 parts of a 50% strength aqueous dodecylbenzyldimethylammonium chloride solution are then added. The mixture is oxidised under reflux in 7 hours by passing 10 to 15 l of air per hour through the solution. The product is filtered off with suction, washed first with water, then with 2% strength sulphuric acid and then again with water. It is dried at 70 to 80° C. This gives 27.3 parts (=98% of theory) of pure γ-quinacridone which, in a stoving enamel, represents a brilliant red having high hiding power, high clarity and very good flow behaviour.

We claim:

1. A process for the preparation of a substituted or unsubstituted quinacridone of the formula

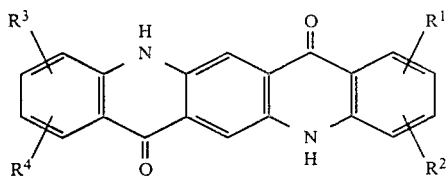

in which $R^1$, $R^2$, $R^3$ and $R^4$ are hydrogen or $C_1$–$C_4$-alkyl, halogen, $C_1$–$C_4$-alkoxy, trifluoromethyl, carboxyl, carbamoyl which is unsubstituted, monosubstituted or disubstituted by $C_1$–$C_4$-alkyl or phenyl, or sulphamoyl which is unsubstituted, monosubstituted or disubstituted by $C_1$–$C_4$-alkyl or phenyl, comprising oxidizing a substituted or unsubstituted dihydroquinacridone of the formula

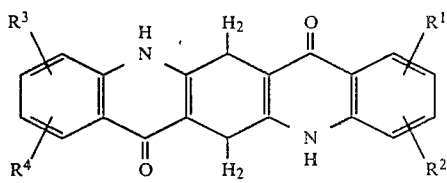

in which $R^1$, $R^2$, $R^3$ and $R^4$ have the above mentioned meanings, with oxygen in the presence of an alkali, a solvent or diluent and an oxygen transfer agent selected from the group consisting of a quinone, a quinone sulphonic acid, a quinone carboxylic acid and a salt thereof, the oxidation being carried out in the presence of a quaternary ammonium compound selected from the group consisting of

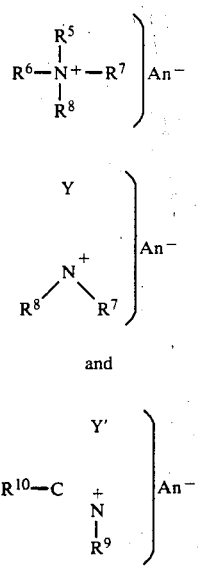

in which
R$^5$, R$^6$, R$^7$, R$^8$, R$^9$ represent C$_1$-C$_{54}$-hydrocarbon radicals whose C chain can be interrupted by 1 to 15 O atoms,
R$^{10}$ represents hydrogen or C$_1$-C$_4$-alkyl, and
Y, Y' represent the remaining members of a ring, or of a ring system and
An$^-$ represents an anionic radical.

2. A process according to claim 1, wherein the starting material comprises a mixture of dihydroquinacridones and the end product comprises a mixture of quinacridones.

3. A process according to claim 1, wherein relative to the dihydroquinacridone, 0.1 to 15% by weight of the quaternary ammonium compound is used.

4. A process according to claim 1, wherein the oxygen transfer agent is anthraquinone, phenanthraquinone, naphthoquinone, an anthraquinone, phenanthraquinone or naphthanthraquinone sulphonic or carboxylic acid, or a salt thereof, and the quaternary ammonium compound is trimethylphenylammonium chloride, triethylphenylammonium chloride, trimethylbenzylammonium chloride, triethylbenzylammonium chloride, dimethyldibenzylammonium chloride, diethyldibenzylammonium chloride, dodecyltrimethylammonium chloride, dodecyldimethylbenzylammonium chloride, an addition product of 5 to 10 mols of ethylene oxide with a C$_{16}$-C$_{20}$-alkylamine, dodecylbenzylalkylamine or dodecylbenzylamine, which is quaternized with dimethyl sulphate or diethyl sulphate, benzylpyridinium chloride, dodecylpyridinium chloride or cetylpyridinium chloride.

5. A process according to claim 1, wherein anthraquinone-2-sulphonic acid is used as the oxygen transfer agent.

6. A process according to claim 1, wherein the reaction is carried out in water, in an alcohol or in a water-alcohol mixture.

7. A process according to claim 3, wherein the oxidation is carried out at 70° to 140° C.

8. A process according to claim 3, wherein the oxidation is carried out using air.

9. A process according to claim 3, wherein relative to the dihydroquinacridone, 0.5 to 8% by weight of the quaternary ammonium compound is used.

10. A process according to claim 6, wherein the alcohol is methanol, ethanol or isopropanol.

11. A process according to claim 3, wherein Y and Y' represent the remaining members of a 5- or 6-membered ring.

12. A process according to claim 3, wherein the C$_1$-C$_4$-alkyl is methyl or ethyl.

13. A process according to claim 3, wherein the halogen is chlorine or fluorine.

14. A process according to claim 3, wherein the C$_1$-C$_4$-alkoxy is methoxy or ethoxy.

15. A process according to claim 3, wherein R$^5$, R$^6$, R$^7$, R$^8$, and R$^9$ are C$_1$-C$_{18}$-alkyl, phenyl, phenyl-C$_1$-C$_{18}$-alkyl or —CH$_2$—CH$_2$O—(CH$_2$CH$_2$O—)$_n$—H, where n is 0 to 20.

16. A process according to claim 3, wherein An$^-$ is chloride, sulphate, methyl sulphate, benzenesulphonate, toluenesulphonate or hydroxide.

17. A process according to claim 3, wherein the starting material is 2,9-dimethyldihydroquinacridone and the oxidation product is 2,9-dimethylquinacridone.

* * * * *

UNITED STATES PATENT AND TRADEMARK OFFICE
CERTIFICATE OF CORRECTION

PATENT NO. : 5,093,497

DATED : March 3, 1992

INVENTOR(S) : Schutze et al.

It is certified that error appears in the above-identified patent and that said Letters Patent is hereby corrected as shown below:

Col. 3, lines 30-44

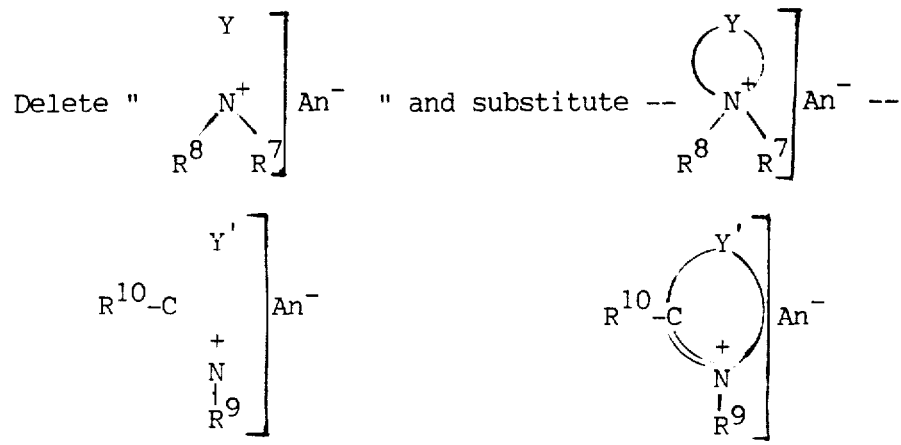

UNITED STATES PATENT AND TRADEMARK OFFICE
CERTIFICATE OF CORRECTION

PATENT NO. : 5,093,497

DATED : March 3, 1992

INVENTOR(S) : Schutze, et al

It is certified that error appears in the above-identified patent and that said Letters Patent is hereby corrected as shown below: Col. 9, lines 9-24

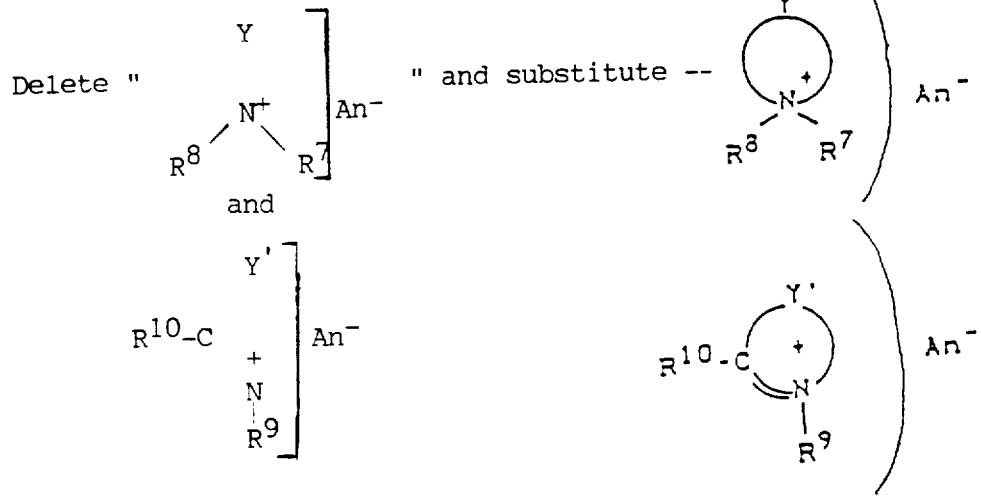

Signed and Sealed this

Twenty-first Day of September, 1993

Attest:

BRUCE LEHMAN

*Attesting Officer*    *Commissioner of Patents and Trademarks*